Aug. 17, 1948.  F. C. BITZENBURGER  2,447,110
SOLDERING IRON
Filed May 15, 1944
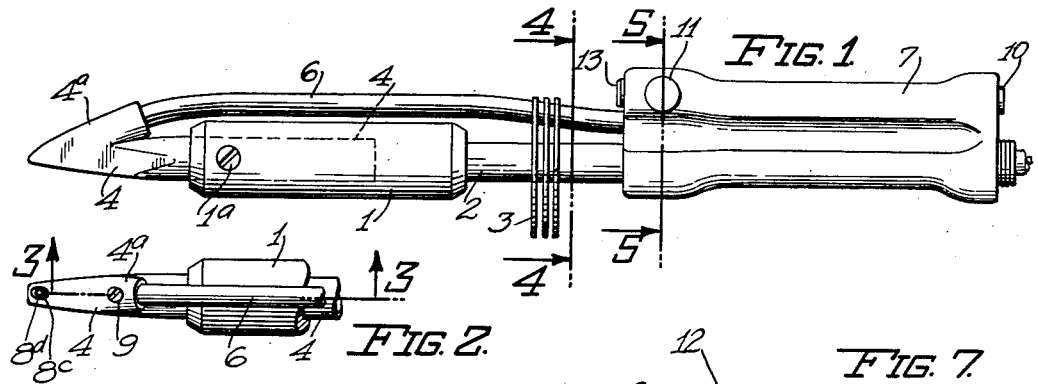
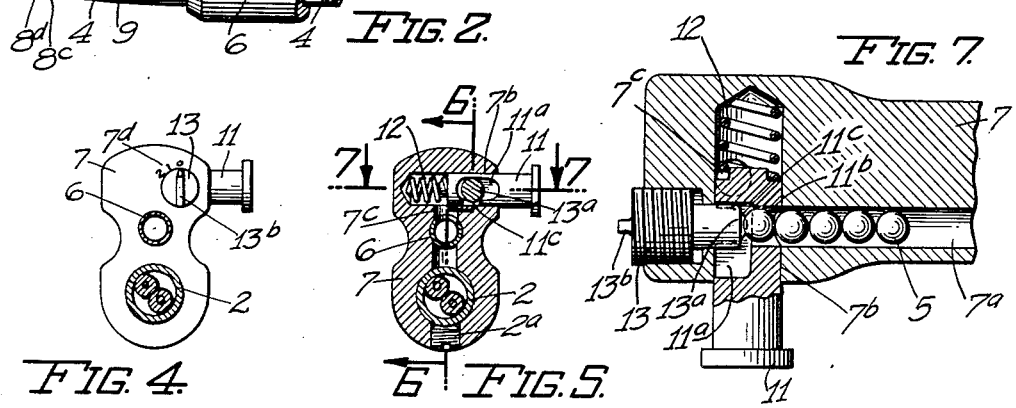
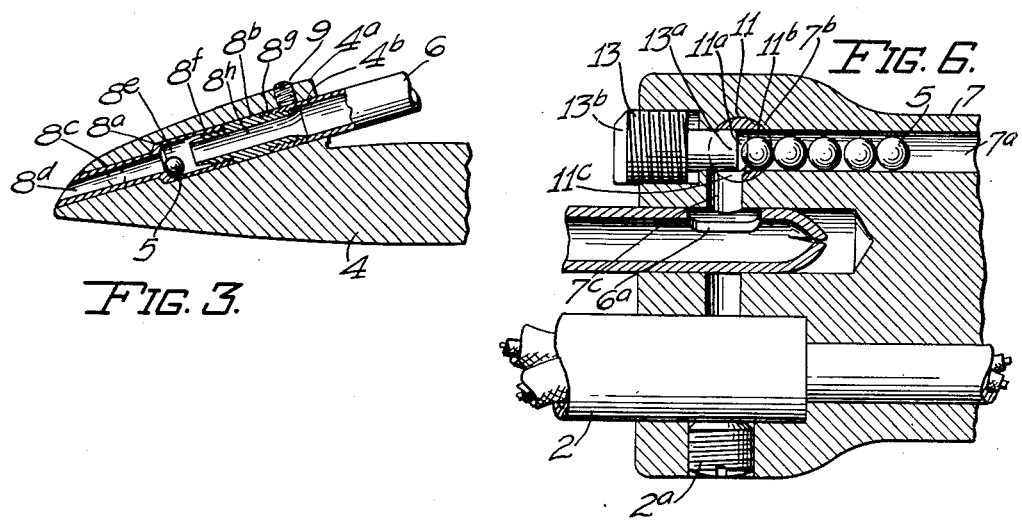
INVENTOR
FRANK C. BITZENBURGER
BY
William B Hall
ATTORNEY.

Patented Aug. 17, 1948

2,447,110

UNITED STATES PATENT OFFICE 2,447,110

SOLDERING IRON

Frank C. Bitzenburger, Los Angeles, Calif.

Application May 15, 1944, Serial No. 535,629

4 Claims. (Cl. 113—109)

My present invention relates to a soldering iron, and particularly to one in which solder is automatically fed to the soldering portion of the iron. This application is a continuation in part of patent application, Serial No. 489,996, filed June 7, 1943, now abandoned.

One of the principal objects of this invention is to provide a novel improvement in a soldering iron, in which solder in the amount desired or required is applied or fed to the soldering portion of the soldering element so that the soldering operation may be carried out economically in the use of solder and time, and further so that the soldering operation may be carried out with one hand.

Another important object of this invention is to provide a soldering iron of this class, in which solder is applied or fed to the soldering element in the form of pellets or small pieces containing approximately the amount of solder desired or required for the soldering operation, and in which there is provided a pocket or enlargement for the reception of pellets or pieces of solder in which they may be melted before being conducted or fed to the soldering portion of the iron, and in which the pocket or recess is so positioned within the conducting or feeding channel that the soldering iron may be tilted at considerable angles forwardly or backwardly, or rotated in any position about its longitudinal axis, without discharging the melted solder from said pocket or recess.

An important object also of this invention is to provide a novel discharge passage at the soldering portion of the iron whereby the iron may be held with its soldering portion in an extreme downwardly directed position without the discharging of the solder before the same is melted.

A further important object of this invention is to provide a soldering iron of this class in which the melted solder will not cohere to the surface of or amalgamate with any portion of the solder conducting channel or passage, and thus will in no way clog or obstruct the feeding channel or passage.

Still another important object of this invention is to provide a simple solder-pellet storing magazine in connection with the handle of the soldering iron, and novel and simple means in connection therewith for controlling the feeding of the soldering pellets, or the various size of such soldering pellets, to the soldering portion of such iron.

With these and other objects in view, as will appear hereinafter, I have devised a soldering iron having certain novel features of construction, combination, and arrangement of parts and portions, as will be hereinafter described in detail and particularly set forth in the appended claims, reference being had to the accompanying drawings, and to the characters of reference thereon, which form a part of this application, in which:

Fig. 1 is a side view of an electric soldering iron embodying my invention;

Fig. 2 is a top view of the soldering end thereof;

Fig. 3 is an enlarged fragmentary sectional view of the soldering end of my soldering iron, with the section taken through 3—3 of Fig. 2;

Figs. 4 and 5 are transverse sectional views thereof, taken through 4—4 and 5—5 of Fig. 1, showing primarily the feed control means of my soldering iron;

Figs. 6 and 7 are enlarged fragmentary sectional views thereof, with the sections taken through 6—6 and 7—7 of Fig. 5, also showing primarily the feed control means of my soldering iron.

The soldering iron shown in Fig. 1 resembles the conventional electric soldering iron, and certain parts, such as the electric heating element 1, the shank 2, and the positioning and shield member 3, may be identical with the corresponding elements of the conventional soldering iron.

The soldering head or element 4, shown in Figs. 1, 2, and 3, is secured to the end of the heating element by a screw 1ª, and is similar in size and shape to that of the conventional electric soldering iron, except that this element is provided with an enlargement, abutment, or branch 4ª at the upper side of its forward end. This enlargement, abutment, or branch 4ª contains a soldering pellet-receiving chamber, which I have referred to as a trap, and which is adapted to receive pellets or small pieces of soldering material, designated 5, through a tube 6, this tube extending backwardly above the electric heating element 1, through the shield 3, to and into the handle or grip 7, which is of special construction, as will be hereinafter described.

The whole of the tube 6, the walls of the pellet-feeding passage, and the walls of the pellet-receiving and melting chamber in the passage may be made of solder-amalgamation or solder-cohesion resisting material. If, however, the tube 6 be made of steel, iron, or similar material with which solder amalgamates or to which it coheres, it is fitted with a special tubular tip 8, as shown in the drawings. This tip is made of material with which solder, and particularly melted solder, does not amalgamate, or to which the solder does not cohere. Thus the solder pellet feeding passage, cannot be readily clogged and thereby rendered inoperative.

This construction also permits the tip 8 to be readily removed for cleaning the same, if for any reason it becomes wholly or partially clogged.

Such material may be an ordinary grade of aluminum. I have found, however, in time, because of impurities in the solder, because of the particular grade of solder, and also because of the particular alloy metals or impurities in the aluminum, the solder will amalgamate with or cohere to the walls of the passage of the tip 8.

A more satisfactory material to repel such amalgamation or resist such cohesion is a heat-resisting glass.

Other materials of which such tip may be made, are alloys of aluminum containing manganese, copper, magnesium, and the like.

Such tip is preferably made of a tubular tip member 8a and a nipple 8b. These members are inserted in a bore 4b which extends longitudinally with respect to the soldering element 4, or slightly angularly with respect to the longitudinal axis of the soldering element, as shown in Fig. 3. This tip is retained in position by a set screw 9.

As shown, the tip member 8a has a reduced forward end 8c which has a tapered bore 8d, which is reduced from its inner to its forward or outer ends. The outer ends of the reduced portion 8c and of the bore 8d terminate at the forward end of the soldering element 4. Intermediate the ends of the tip member is an enlarged bore 8e, which is concentric with the bore 8d. This enlargement is the solder melting chamber.

The nipple 8b is reduced and threaded at the opposite ends, one threaded end, 8f, extending into the inner or rear end of the tip member 8a and the other threaded end, 8g, being screwed into the forward end of the tube 6. This nipple has an axial bore 8h which is smaller in diameter than the melting chamber 8e, the rear end of the bore 8h being preferably tapered to merge with the walls of the tube 6, as shown. The forward end of the nipple 8b is preferably bevelled, as shown, to form a backwardly bevelled channel around the forward end of the nipple, thereby better to prevent the melted solder in the melting chamber from passing backwardly through the nipple into the tip 6 even though the soldering end of the soldering iron is pointed upwardly. Such construction provides a trap to prevent return of melted solder to the pellet feeding passage.

The tapered bore 8d facilitates the dropping of the soldering pellets into the same, but holds the same therein until such pellets are melted.

The handle or grip 7 is secured, such as by a screw 2a, to the rear end of the shank 2, and in this manner is held in fixed relation with respect to the soldering element. This handle contains a longitudinal bore 7a which provides a magazine for storing the soldering pellets 5. The rear end of the magazine may be closed by means of a cap or plug 10. At the forward end of the handle 7 is a transverse bore 7b which intersects the magazine bore 7a. In the bore 7b is reciprocally mounted a feed plunger or button 11, which may be readily depressed with the thumb of the right hand used in gripping the handle 7. The plunger or button 11 is normally forced outwardly by a compression spring 12, but is prevented from being expelled from the handle or grip, by means of a screw 13 which performs manifold functions. The inner end 13a of this screw extends into an elongated groove 11a in the shank of the plunger or button 11 for guiding and limiting the movements of the latter. The screw 13 is in axial alignment with the magazine bore 7a, and, in addition to guiding and preventing the removal of the button 11, it is designed to prevent the pellets in the magazine from being forced or discharged from the bore in greater numbers than one at a time. The shank of the button 11 is provided with a transverse hole 11b which is located at the inner end of the groove 11a. This hole 11b, when the button is in its outer position, is aligned with the magazine bore 7a so that a pellet 5 in the magazine may enter the hole 11b and engage the limiting or inner end 13a of the screw 13. The shank of the button 11 is also provided with a hole or notch 11c which extends downwardly from the groove 11a and substantially coplanar with the hole 11b. This hole or notch 11c, when the button is forced inwardly, is positioned opposite or in line with a hole 7c in the handle, and permits the pellet 5, located or confined in the hole 11b and which has passed the inner end of the screw 13, to drop into the notch 11c, thence through the hole 7c into a cut-out portion 6a at the upper side of the portion of the tube 6 which extends into the handle, as shown in Figs. 5 and 6. The hole or slot 6a is preferably elongated so as to take care of any variation in length of soldering tips or elements 4.

The screw 13 may be adjusted to take care of the variation in sizes of the soldering pellets or perhaps to determine whether one or more of such pellets should be fed from the magazine to the soldering element. The outer end of the screw may be provided with an index portion or ridge 13b to indicate the adjusted position thereof, and the surrounding wall of the end of the handle or grip may be provided with numerals 7d to facilitate the adjustment of the screw 13.

The handle 7 may be provided with longitudinal magazines or bores 7a at its opposite sides for containing therein solder pellets of different sizes. The forward ends of the tip of said bores may have buttons 11 for feeding the solder pellets from different magazines into a unitary pellet feeding tube. The buttons 11 for each side of the bore or passage 7a may be combined into a unitary member.

Though I have shown and described a particular construction, combination, and arrangement of parts and portions, and a certain modification thereof, I do not wish to be limited to the same, but desire to include in the scope of my invention the construction, combination, and arrangement substantially as set forth in the appended claims.

I claim:

1. In a soldering iron, a soldering element having a substantially longitudinal tubular passage therein, said passage extending to near the soldering end of the element and provided intermediate the forward and rear portions of the passage with an enlargement, the forward end of said rear portion extending forwardly of the rear end of the enlargement forming an undercut recess backwardly from said forward end of the rear portion of the passage, said enlargement being so constructed and arranged with respect to said passage as to retard outward flow of melted solder and prevent backward flow.

2. In a soldering iron, a soldering element, a tubular means longitudinally positioned and secured therein and extending from the soldering to the opposite end thereof, said tubular means comprising a tubular tip and a feed tube, said tip having a reduced end extending through the soldering end, said reduced end having a small bore with a diametrical enlargement at its inner end, said feed tube being fitted into the enlargement of the tip and provided with a bore smaller than said enlargement, the forward end of the feed tube being spaced from the inner end of the small bore of the tip.

3. In a soldering iron, a soldering element having a shank, a handle secured to the shank, said handle having a soldering pellet feeding passage, said shank having in association therewith a similar passage offset with respect to the passage in the handle, and a pellet feeding member reciprocally mounted in association with the handle and provided with a transverse port capable of being normally aligned with the passage in the handle for receiving a pellet therefrom and capable of being shifted in alignment with the passage in association with the shank whereby said pellet may be directed from the handle passage to the passage in the pellet feeding member.

4. In a soldering iron, a soldering element having a shank, a handle secured to the shank, said handle having a soldering pellet feeding passage, said shank having in association therewith a similar passage offset with respect to the passage in the handle, and a pellet feeding member reciprocally mounted in a transverse direction in association with the handle and provided with transverse ports positioned at right angles to each other, one port being normally in alignment with the passage in the handle for receiving a pellet therefrom, and the other port being shiftable in alignment with the passage in association with the shank whereby said pellet may be directed into the second port and into the latter passage.

FRANK C. BITZENBURGER.

REFERENCES CITED

The following references are of record in the file of this patent:

UNITED STATES PATENTS

| Number | Name | Date |
|---|---|---|
| 1,127,970 | Dryfoos | Feb. 9, 1915 |
| 1,691,052 | Fay | Nov. 13, 1928 |
| 1,957,325 | Davis | May 1, 1934 |
| 1,232,734 | Tilton | July 10, 1917 |
| 1,277,793 | Wall | Sept. 3, 1918 |
| 2,175,100 | Albert | Oct. 3, 1939 |
| 2,274,413 | Ingerson | Feb. 24, 1942 |

FOREIGN PATENTS

| Number | Country | Date |
|---|---|---|
| 13,928 | France | Aug. 7, 1911 |
| 398,543 | France | June 7, 1909 |
| 577,204 | France | Sept. 2, 1924 |